(12) United States Patent
Hay et al.

(10) Patent No.: US 7,584,313 B1
(45) Date of Patent: Sep. 1, 2009

(54) METHOD AND SYSTEM FOR CONNECTING A WIRELESS USB HOST AND A WIRED USB DEVICE

(75) Inventors: Ran Hay, Rosh Ha'Ayin (IL); Pavel Smirnov, Ramat Gan (IL); Ilia Saveliev, Beer Sheva (IL); Haim Kupershmidt, Or Yehuda (IL); David Yaish, Tel Aviv (IL); Gadi Shor, Tel Aviv (IL)

(73) Assignee: Wisair Ltd, Tel Aviv (IL)

( * ) Notice: Subject to any disclaimer, the term of this patent is extended or adjusted under 35 U.S.C. 154(b) by 0 days.

(21) Appl. No.: 11/828,064

(22) Filed: Jul. 25, 2007

(51) Int. Cl.
*G06F 13/12* (2006.01)
*G06F 13/00* (2006.01)

(52) U.S. Cl. .................. 710/62; 710/72; 710/8; 710/15

(58) Field of Classification Search ............ 710/62–24, 710/72–74, 8–10, 15–19
See application file for complete search history.

(56) References Cited

U.S. PATENT DOCUMENTS

| | | | |
|---|---|---|---|
| 2005/0177669 A1* | 8/2005 | Peters et al. | 710/300 |
| 2006/0179144 A1* | 8/2006 | Nagase | 709/226 |
| 2007/0038784 A1* | 2/2007 | Sung et al. | 710/56 |
| 2007/0204069 A1* | 8/2007 | Bhesania et al. | 710/8 |
| 2007/0300004 A1* | 12/2007 | Yun | 710/313 |
| 2008/0003556 A1* | 1/2008 | Takahashi et al. | 434/307 R |
| 2008/0040796 A1* | 2/2008 | Takasu | 726/18 |

* cited by examiner

*Primary Examiner*—Christopher B Shin
(74) *Attorney, Agent, or Firm*—Pearl Cohen Zedek Latzer, LLP

(57) ABSTRACT

An intermediate device, including: (a) a wired USB communications component; (b) a wireless USB communications component; (c) a memory unit; (d) a processor, connected to the wired USB communications component, to the wireless USB communications component and to the memory unit, and (e) a USB class compliant driver emulator constructed in response to at least one characteristic of the USB device.

26 Claims, 9 Drawing Sheets

103

104

METHOD AND SYSTEM FOR CONNECTING A WIRELESS USB HOST AND A WIRED USB DEVICE

FIELD OF THE INVENTION

The invention relates to methods and systems for connecting a wireless Universal Serial Bus (USB) host and a wired USB device.

BACKGROUND OF THE INVENTION

The standard (wired) USB protocol differs from wireless USB protocols in the standardization of both the physical and the logical aspects of communication. Several adaptations are needed in order to allow a USB device that was designed for wired communication to use wireless communication. Some of those adaptations are physical and require a hardware solution, whereas other needed adaptations are logical and require a software solution.

FIG. 1 illustrates a prior art solution of connecting a wireless universal serial bus (USB) host and a wired USB device. System 109 includes wireless USB host 220 that is connected to host wire adapter (HWA) 221, which conveniently is a USB2 device that is connected to wireless USB host 220 in order to facilitate wireless USB communication to wireless USB host 220. System 109 also include two native WUSB devices 211 (a native WUSB printer and a native WUSB scanner, which are offered by way of example), which are adapted to independently connect wirelessly with wireless USB host 220.

The two other devices shown in FIG. 1 are wired USB devices 210 (a USB printer and a USB scanner), which are not adapted to communicate wirelessly with wireless USB host 220. Therefore, according to a prior art solution, wired USB devices 210 are connected to device wire adapter (DWA) 202.

Device wire adapter 202 and host wire adapter 221 alter and manage the transactions between USB devices 210 and wireless USB host 220 so as to conform to a wireless communication protocol.

This prior art solution has the disadvantage of necessitating a support for DWA/HWA drivers on wireless USB host 220. Moreover, this solution further suffers from a lower transfer rate due to DWA/HWA protocol overhead.

The solution discussed above and other solutions to this problem discussed in the literature are insensitive to the specific requirements of each USB class. The attempt to enable all types of USB classes to communicate wirelessly by a single solution such as in the DWA/HWA model results in a lower transfer rate, due to the larger amount of protocol overhead. It is further clear to any person that is skilled in the art, that the actualization of a full capabilities device wire adapter 202 that is able to handle all or most of the USB class not only slows the communication, it is also complicated and costly.

There is a need provide an efficient method and system for connecting a wireless USB host and a wired USB device.

SUMMARY OF THE INVENTION

An intermediate device, including: (a) a wired USB communications component; (b) a wireless USB communications component; (c) a memory unit; (d) a processor, connected to the wired USB communications component, to the wireless USB communications component and to the memory unit, and (e) a USB class compliant driver emulator constructed in response to at least one characteristic of the USB device.

A method for connecting a wireless USB host and a wired USB device, the method includes: (a) initiating a wired connection between an intermediate device and the USB device, using at least one USB class compliant driver emulator that is included in the intermediate device; (b) setting up a wireless connection between the intermediate device and the wireless host; (c) processing input data received from a source device to provide output data; and (d) sending the output data to a target device; wherein the target device and the source device are selected from the wireless USB host and the wired USB device.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

The following descriptions of the drawings include both descriptions of systems for connecting a wireless USB host and a wired USB device, according to different embodiments of the invention, and methods for connecting the wireless USB host to the wired USB device. It will be appreciated by any person skilled in the art that considering the entire disclosure of both the systems and the methods may enhance the clarity of the descriptions. It is further noted, however, that both the systems and the method could be practiced independently, and that the different disclosures should be considered both as stand alone disclosures and as a whole.

Figure 1:
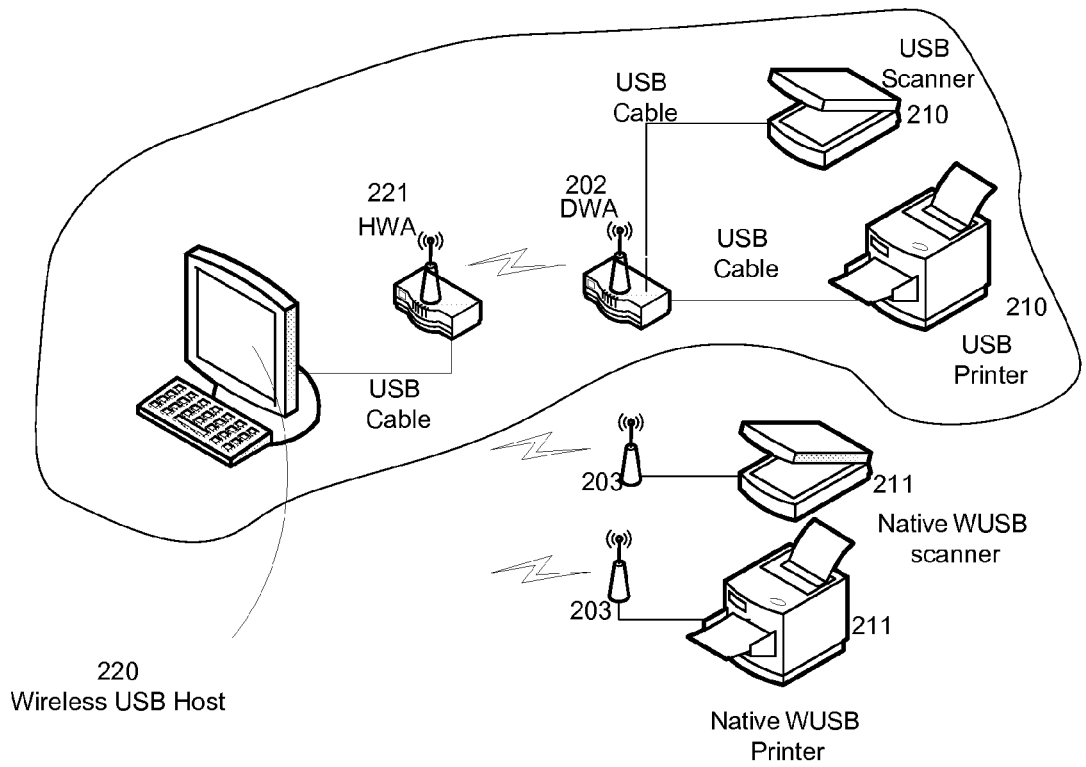
FIG. 1 illustrates a prior art solution of connecting a wireless universal serial bus (USB) host and a wired USB device.
Figure 2A:
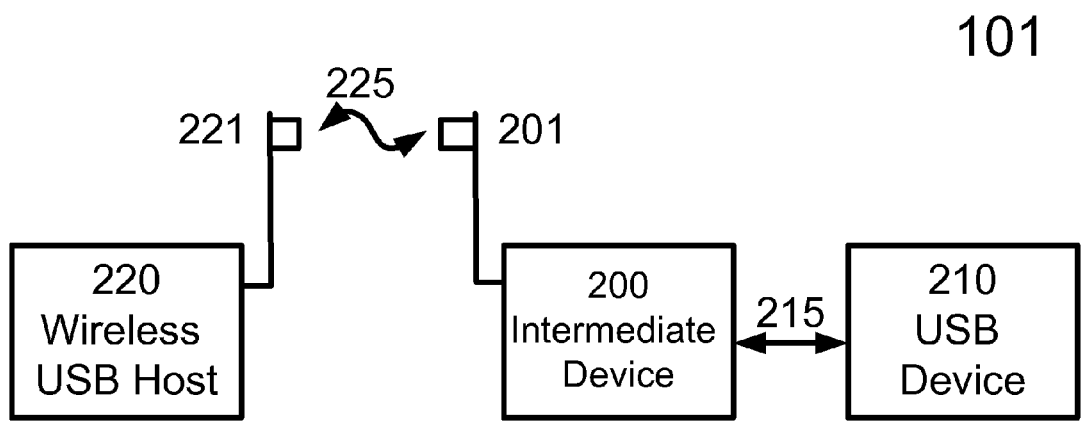
FIG. 2a illustrates a system, according to an embodiment of the invention, which includes an intermediated device that is connected by a wired circuit to a wired USB device.
Figure 2B:
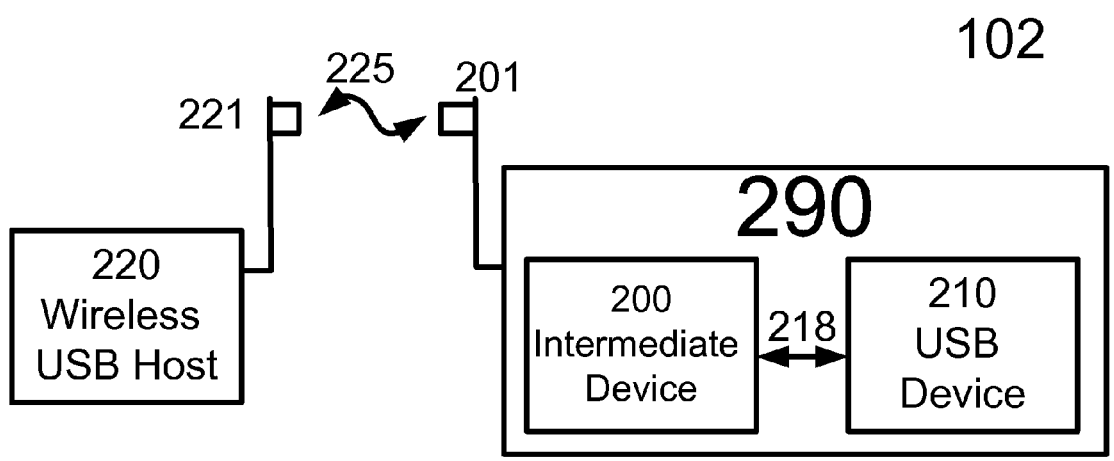
FIG. 2b illustrates a system, according to an embodiment of the invention, in which the intermediate device and the wired USB device are integrated to form a combined device.

FIGS. 2a and 2b illustrate USB device 210, wireless USB host 220 and intermediate device 200, according to various embodiments of the invention.

FIG. 2a illustrates system 101, according to an embodiment of the invention, which includes intermediated device 200 that is connected by wired circuit 215 to wired USB device 210. Intermediate device 200 and wireless USB host 220 exchange data via a wireless channel 225 established between internal antenna 201 (connected to intermediate device 200) and host antenna 221 (connected to wireless USB host 220).

FIG. 2b illustrates system 102, according to an embodiment of the invention, in which intermediate device 200 and wired USB device 210 are integrated to form combined device 290. Combined device 290 also includes internal wired circuit 216 that connect intermediate device 200 to wired USB device 210. It is noted that, in other embodiments of the invention, the combined device 290 may further include an external antenna (not shown) that replaces internal antenna 201.

It is noted that according to an embodiment of the invention, intermediate device 200 is implemented on a dedicated chip, and that according to an embodiment of the invention, both intermediate device 200 and internal antenna 201 are implemented on a single chip.

It is further noted that in various embodiments of the invention, intermediate device 200 can be connected to multiple USB devices (not shown) that have at least one mutual USB characteristic. Each of those multiple USB devices may be connected to intermediate device 200 directly, or via another USB device in a daisy chain.

According to an embodiment of the invention, intermediate device 200 is further adapted to provide power to wired USB device 210. According to an embodiment of the invention, the supplying of power is carried out according to standard power supplying standards, wherein, according to an embodiment of the invention, the supplying of power is carried out via a standard USB interface (such as via a standard USB cable).

Figure 2C:
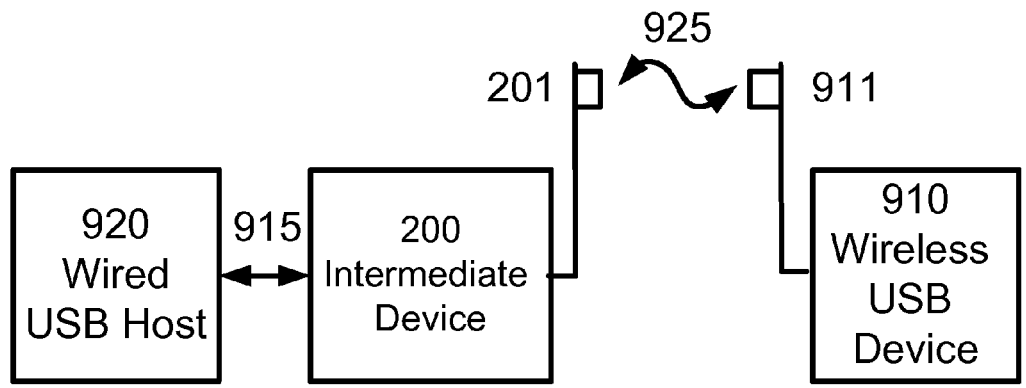
FIG. 2c illustrates a system, according to an embodiment of the invention, in which the intermediate device is connected by wired circuit to a wired USB host.

FIG. 2c illustrates system 104, according to an embodiment of the invention, in which intermediate device 200 is connected by wired circuit 915 to wired USB host 920. intermediate device 200 is also connected to wireless USB device 910 via wireless channel 925, which is conveniently facilitated by antennas 201 and 911.

It is noted that the in the illustrated scenario, intermediate device 200 is being used to connect wired USB host 920 and wireless USB device 910, which differs from the previous systems 101 and 102.

The way in which different embodiments of intermediate device 200 and the methods which are offered in the descriptions of the drawing is applicable to such a system is however clear to any person who is skilled in the art.

According to an embodiment of the invention, wired USB host 920 is a computer, whereas according to another embodiment of the invention, wired USB host 920 is a wired USB device which is further adapted to serve as a host in different situations (examples for such wired USB devices are digital cameras, printers and so forth).

Figure 2D:
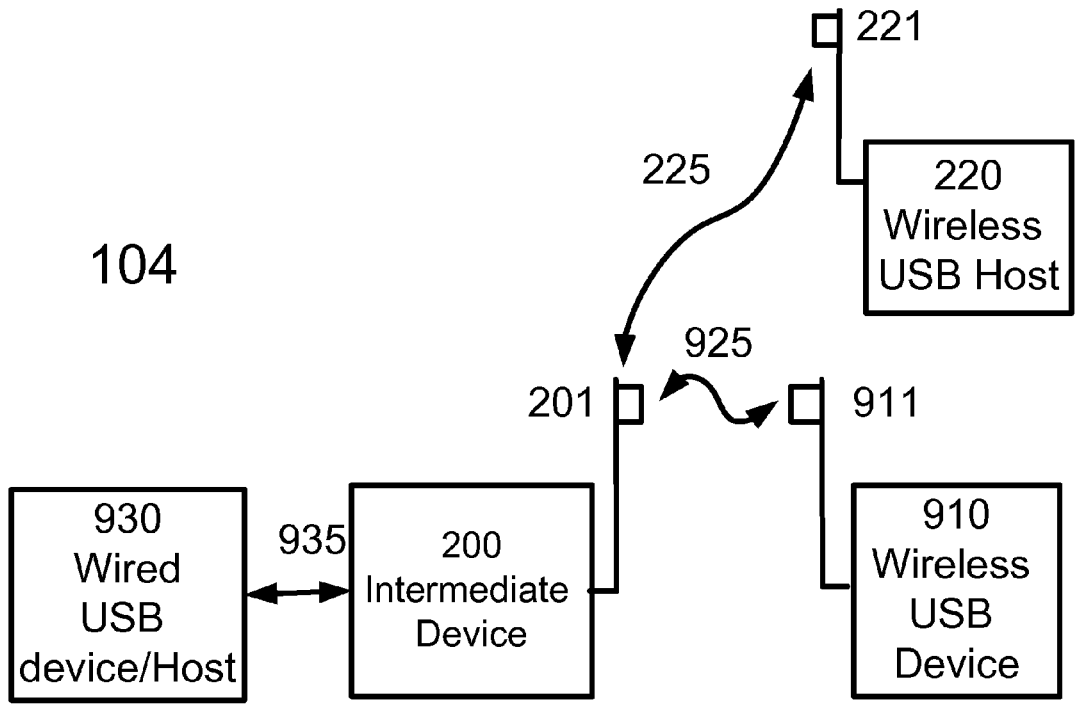
FIG. 2d illustrates a system, according to an embodiment of the invention, that includes a wired USB device which is further adapted to serve as a wired USB host, and which is connected to the intermediate device via a wired circuit.

FIG. 2d illustrates system 105, according to an embodiment of the invention, that includes wired USB device 930, which is further adapted to serve as a wired USB host, and which is connected to intermediate device 200 via wired circuit 935.

Intermediate device 200 is connected to wireless USB device 910 via wireless channel 925, as well as to wireless USB host 220, via wireless channel 225. It is noted that according to an embodiment of the invention, intermediate device 200 is adapted both to connect wired USB device 930 to wireless USB host 220, and to connect wired USB device 930, when it functions as a host, to wireless USB device 910.

The way in which different embodiments of intermediate device 200 and the methods which are offered in the descriptions of the drawing is applicable to such a system is however clear to any person who is skilled in the art.

Figure 3:
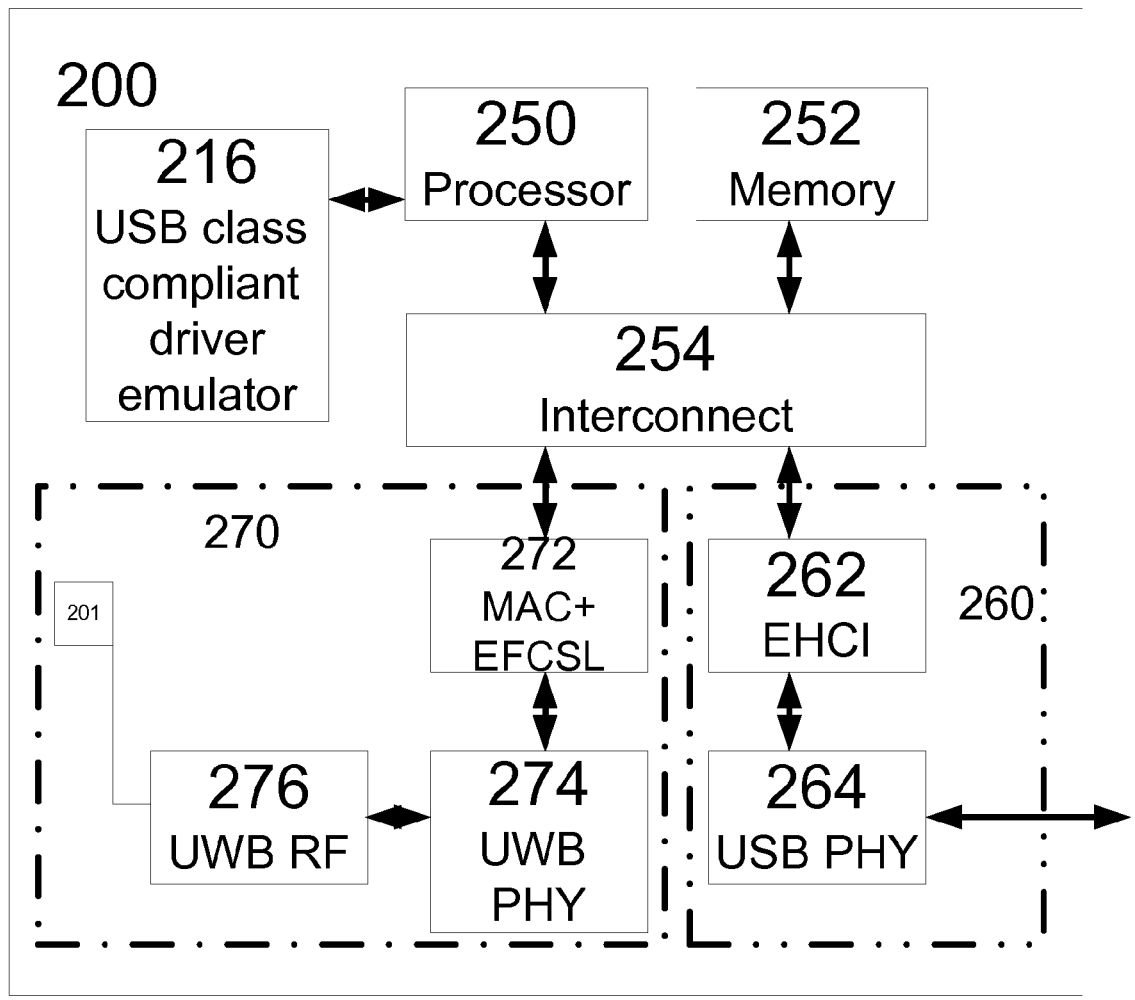
FIG. 3 is a block diagram of the intermediate device, according to an embodiment of the invention.

FIG. 3 is a block diagram of intermediate device 200 according to an embodiment of the invention. Intermediate device 200 includes: processor 250 that is connected to memory unit 252; to wired USB communication component 260 and to wireless USB communication component 270. Processor 250, communication components 260 and 270 and memory 252 are connected to each other through interconnect 254.

Intermediate device 200 includes a USB class compliant driver emulator 216 which is constructed in response to at least one USB class of wired USB device 210. According to an embodiment of the invention, USB class compliant driver emulator 216 may be implemented in hardware, or be in a form of a software that is executed by processor 250 or by another component of intermediate device 200.

It is noted that, according to an embodiment of the invention, the USB class compliant driver emulator 216 is a USB mass storage device class compliant driver, and wherein intermediate device 200 is adapted to set the wired USB communication with one or more wired USB devices 210 which are USB mass storage device.

According to an embodiment of the invention, wired USB communication component 260 includes an Extended Host Controller Interface (EHCI) 262 that is connected to processor 250, either directly or via interconnect 254. EHCI 262 is connected to a USB physical component 264 (denoted as USB PHY) that enables the establishment of the wired circuit 215 with the USB device 210, and allows conveying information over it.

According to an embodiment of the invention, wireless USB communication component 270 includes MAC+EFCSL unit 272 which is connected to processor 250, either directly or via interconnect 254. MAC+EFCSL unit 272 is connected to ultra wide band physical component 264 (denoted as UWB PHY). Ultra wide band physical component 264 is connected to internal antenna 201 via ultra wide band radio frequency component 276 (denoted as UWB RF). According to the illustrated embodiment of the invention, the group of wireless communication components 272, 274, 276 and 201 enables the exchange of information over wireless channel 225 with wireless USB host 220.

It is noted that FIG. 2 illustrates an intermediate device that has only one physical layer component, one MAC layer component and one EFSCL layer component merely for the clarification and simplicity of the explanation. It is however clear to any person who is skilled in the art that usually each of said components represent multiple software and hardware components, and that some components can service more than a single layer. It is further noted that the EFCSL layer component can be replaced by another component that applies operations of another layer. It is further clear to any person who is skilled in the art that various other components were omitted for simplicity of explanation. By way of an example only, and not intended to limit the scope of the invention in any way, said omitted components can include application physical and MAC layer components, and various layer management entities.

Figure 4:
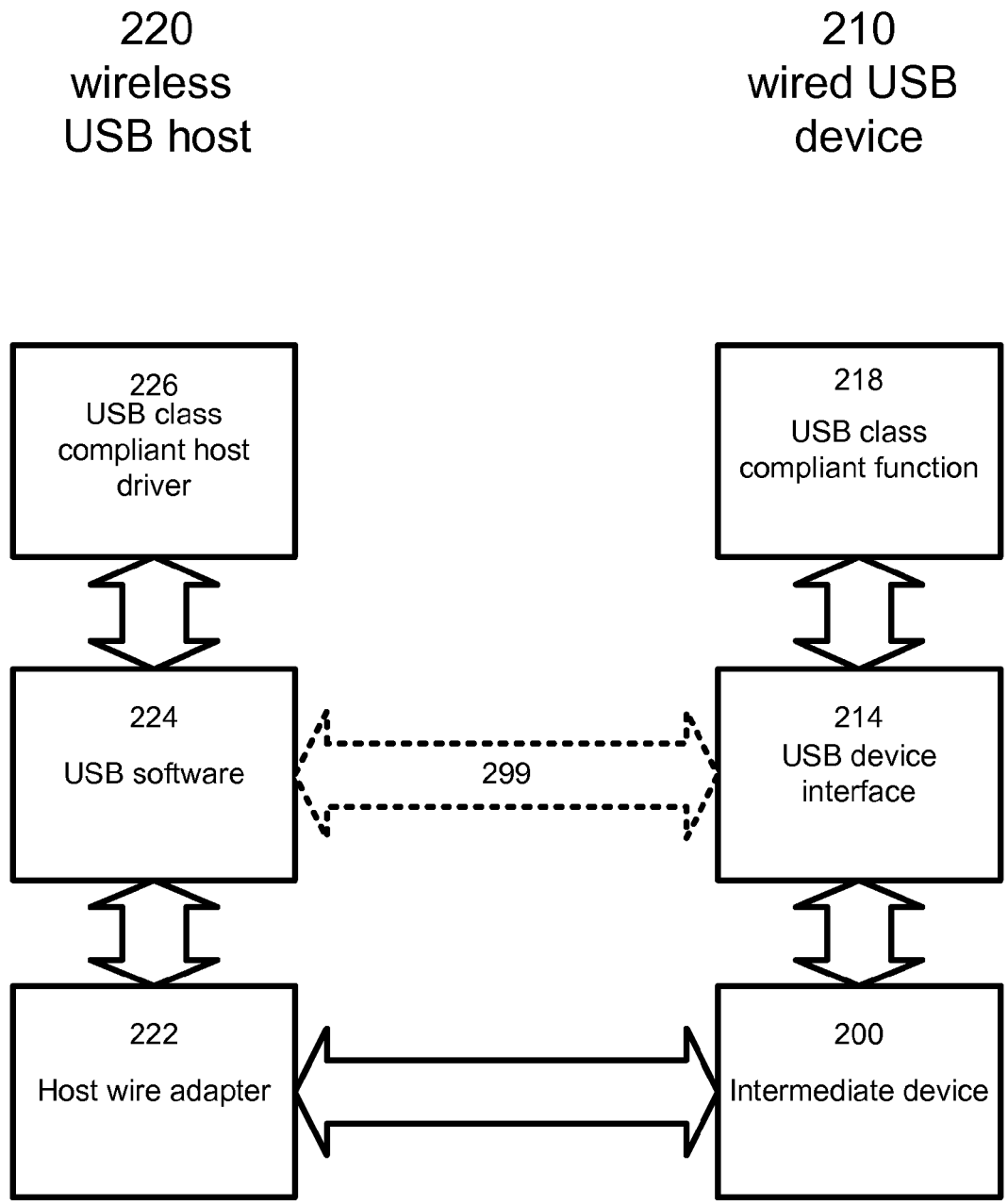
FIG. 4 is a block diagram of communication between the wireless USB host and the wired USB device, according to an embodiment of the invention

FIG. 4 is a block diagram of communication between wireless USB host 220 and wired USB device 210, according to an embodiment of the invention. Conveniently, wired USB device 210 is compatible to one or more USB classes.

A USB Class describes a group of devices or interfaces with similar attributes or services. A Class specification defines the requirements for such a related group, wherein the class specifications allow manufacturers to create implementations which may be managed by device drivers. Each USB class is a set of computing communications protocols which are defined by the USB Implementers Forum and which run on the USB. Examples for USB classes are mass storage class, audio device class and printer class.

It is noted that while wired USB device 210 may be compatible to more than one USB class, the specification of the invention typically refers only to one USB class to which wired USB device 210 is compatible. It is, however, perspicuous to every person that is skilled in the art that the implementation of the invention for wired USB devices that are compatible to more than one USB class is straight forward. For similar reason, and in order to simplify and clarify the explanation, the term the USB class will refer during the explanation to a USB class to which wired USB device is compatible.

Conveniently, wired USB device 210 includes USB class compliant function 218 and wireless USB host 220 stores USB class host compliant driver 226, wherein both of USB class host compliant driver 226 and USB class compliant function 218 are adapted to support specific protocols and the like which are associated to the USB class.

USB software 224 which is included in wireless USB host 220 and USB device interface 214 which is included in wired USB device 210 are conveniently adapted to carry out the USB communication between wired USB device 210 and wireless USB host 220, wherein USB class compliant function 218 is compatible with USB class compliant driver emulator 216, and USB software 224 is compatible with USB class host compliant driver 226.

It is noted that, conveniently, both USB class host compliant driver 226 and USB software 224 are included in wireless USB host 220.

In prior art solutions, the communication between USB device interface 214 and USB software 224 is carried out over wired interface 299. Conveniently, said communication is further enabled by USB hardware (not shown) of wired USB device 210 and by host controller (not shown) of wireless USB host 220.

According to the teaching of the invention, the wireless USB communication between wireless USB device 210 and wireless USB host 220 is enabled by host wireless adapter 222, which is conveniently included in intermediate device 200.

It is clear to any person who is skilled in the art, that even though the actual communication between wired USB device 210 and wireless USB host 220 is wireless, components 214, 218, 224 and 226 are adapted for standard wired USB communication. It is therefore desirable to have intermediate device 200 and host wire adapter 222 which are adapted to carry out the wireless communication in response to the standard wired USB communication to which components 214, 218, 224 and 226 are adapted.

Conveniently, intermediate device 200 is adapted to communicate wirelessly via host wire adapter 222 with wireless USB host 220 at least partially in response to a standard wired USB protocol which is used by wired USB device 210 and by wireless USB host 220.

It is noted that conveniently, the standard wired USB protocol is dedicated to the USB class, and therefore intermediate device 200 is adapted to communicate wirelessly via host wire adapter 222 with wireless USB host 220 at least partially in response to a standard USB class dedicated protocol which is used by wired USB device 210 and by wireless USB host 220.

According to an embodiment of the invention, intermediate device 200 is adapted to determine whether wired USB device 210 belongs to the USB class (i.e. a USB class which is one of the at least one USB classes which are dedicatedly supported by intermediate device 200). Conveniently, intermediate device is adapted to determine whether wired USB device 210 belongs to the USB class in response to a descriptor of wired USB device 210, or in response to information which is included in the data received from wired USB device 210.

Conveniently, if wired USB device 210 belongs to the USB class than intermediate device 200 is adapted to connect wired USB device 210 and wireless USB host 220 as aforementioned; whereas if wired USB device 210 does not belong to the USB class, but rather to a USB class which is not dedicatedly supported by intermediate device 200 (such as, for example, in a situation in which intermediate device 200 is designed to work with one set of USB devices 210, and a USB device 210 for which is intermediate device 200 not designated is connected to intermediate device 200, or wherein intermediate 200 is connected to multiple USB devices 210, not all of which are of the USB class), than intermediate device 200 is adapted to connect wired USB device 210 and wireless USB host 220 in a non dedicated way, such as—though not limited to—prior art solutions of connecting wireless USB host 220 and wired USB device 210.

It is noted that according to an embodiment of the invention, intermediate device 200 is adapted to determine whether wired USB device 210 belongs to the USB class in response only to information which is included in the data which is transmitted by wired USB device 210, without requesting any additional providing of information from wired USB device 210.

It is noted that, according to different embodiments of the invention, the determination whether wired USB device belongs or does not belong to the USB class is carried out during different stages of the connecting of wired USB device 210 and wireless USB host 220.

It is noted that according to an embodiment of the invention, intermediate device 200 is adapted to connect multiple wired USB devices 210 to wireless USB host 220, such as though not limited to multiple wired USB devices 210 which are connected in a daisy chain formation.

Therefore, situations may occur in which one or more of said wired USB devices 210 will belong to one or more USB classes of the supported USB classes, whereas one or more other wired USB devices 210 will not belong to said on or more USB classes. Conveniently, in this situation, intermediate device 200 is adapted to connect wired USB devices 210 which belong to the supported USB classes according to the aforementioned teachings of the invention, while connecting wired USB devices 210 which do not belong to the supported USB classes to wireless USB host 220 in a non dedicated way, such as—though not limited to—prior art solutions of connecting wireless USB host 220 and wired USB device 210.

Figure 5:
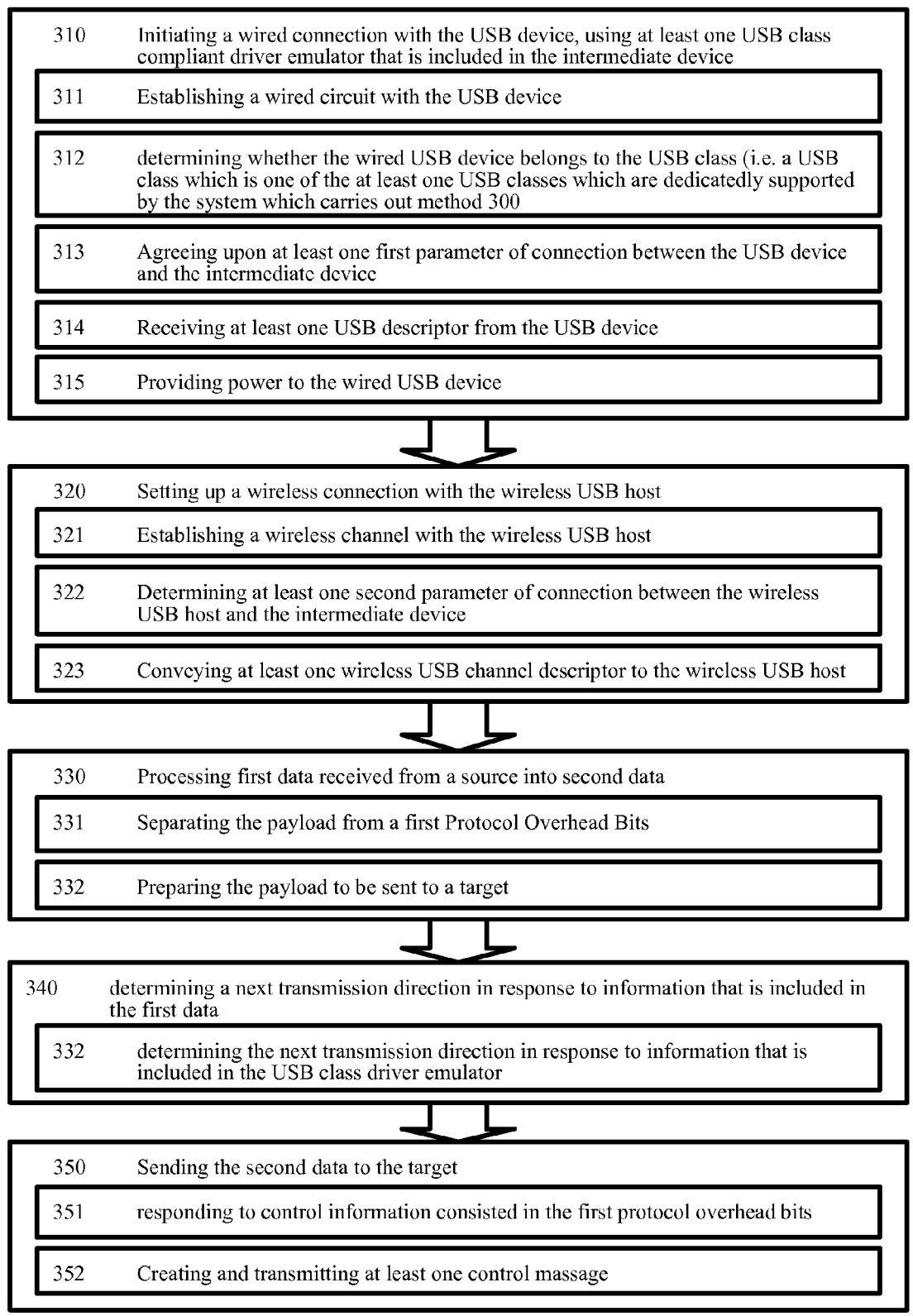
FIG. 5 illustrates a method for connecting the wired USB device to the wireless USB host, according to an embodiment of the invention.

FIG. 5 illustrates a method 300 for connecting a wired USB device to a wireless USB host according to an embodiment of the invention. Referring to the examples set forth in the previous drawings, according to an embodiment of the invention, method 300 is carried out by intermediate device 200. Referring to same examples, conveniently, the wired USB device is wired USB device 210, and the wireless USB host is wireless USB host 220.

Method 300 starts by stage 310 of initiating a wired connection with the USB device, using at least one USB class compliant driver emulator, which is compatible to at least one USB class of the USB device, and is included in the intermediate device.

Stage 310 starts with stage 311 of establishing a wired circuit with the USB device.

It is noted that, according to an embodiment of the invention, method 300 includes connecting multiple USB devices, which belong to different USB classes which are supported by at least one USB class compliant driver emulator, to a wireless USB host, in response to content of the at least one USB class compliant driver emulator.

According to an embodiment of the invention, stage 310 includes stage 312 of determining whether the wired USB device belongs to the USB class (i.e. a USB class which is one of the at least one USB classes which are dedicatedly supported by the system which carries out method 300). According to some embodiments of the invention, stage 312 includes determining whether the wired USB device belongs to the USB class in response to a descriptor of the wired USB device, or in response to information that is included in the data which is received from the wired USB device.

Conveniently, if the Wired USB device belongs to the USB class than method 300 continues as specified below; and if the Wired USB device do not belong to the USB class, but rather to a USB class which is not dedicatedly supported by the system which carries out method 300, than the connection of the wireless USB host and the Wired USB device is carried out in a non dedicated way, such as—though not limited to—prior art solutions of connecting a wireless USB host and a Wired USB device.

It is noted that according to an embodiment of the invention, the determining of stage 310 is responsive only to information which is included in the data which is transmitted by the Wired USB device, without requesting any additional providing of information from the Wired USB device.

It is noted that, according to an embodiment of the invention, stage 312 may be further carried out in another stage during method 300, such as during an iteration of stage 330.

It is noted that since according to an embodiment of the invention, method 300 supports connecting multiple Wired USB devices to a wireless USB host, such as though not limited to multiple Wired USB devices which are connected in a daisy chain formation, situations may occur in which one or more of said Wired USB devices will belong to one or more USB classes of the supported USB classes, whereas one or more other Wired USB devices will not belong to said on or more USB classes. Conveniently, in this situation, method 300 includes connecting the Wired USB devices which belong to the supported USB classes according to the following stages of method 300, while connecting the Wired USB devices which do not belong to the supported USB classes in a non dedicated way, such as—though not limited to—prior art solutions of connecting a wireless USB host and a Wired USB device.

Stage 310 continues with stage 313 of a agreeing upon at least one first parameter of connection between the USB device and the intermediate device. Conveniently, the intermediate device simulates a USB host for the USB device during stage 313.

Stage 313 is followed by stage 314 of receiving at least one USB descriptor from the USB device.

According to an embodiment of the invention, stage 310 further includes stage 315 of providing power to the wired USB device. According to an embodiment of the invention, the supplying of power is carried out according to standard power supplying standards, wherein, according to an embodiment of the invention, the supplying of power is carried out via a standard USB interface (such as via a standard USB cable). It is noted that conveniently, according to embodiments of the invention which implements stage 315, the supplying of power to the wired USB device continues during additional stages of method 300 (or during the entire carrying out of method 300).

According to an embodiment of the invention, the initiating includes initiating the wired connection between the intermediate device and at least one USB mass storage device, using at least one USB mass storage device class compliant driver that is included in the intermediate device.

Stage 310 is followed by stage 320 of setting up a wireless connection with the wireless USB host.

Stage 320 starts with stage 321 of establishing a wireless channel with the wireless USB host.

Stage 321 is followed by stage 322 of determining at least one second parameter of connection between the wireless USB host and the intermediate device. Conveniently, the intermediate device simulates a wireless USB device for the wireless USB host during stage 322.

Stage 322 is followed by stage 323 of conveying at least one wireless USB channel descriptor to the wireless USB host. The wireless USB channel descriptor is determined by the intermediate device consequently to receiving information from the USB class compliant driver emulator. Conveniently, wireless USB channel descriptors are further determined in response to the USB descriptors, to information gathered during stages 313 and 322, or to any combination of them.

It is noted that conveniently, stage 320 is carried out in response to a USB class driver that is included in the wireless USB host.

It is noted that according to an embodiment of the invention, stage 320 includes a transmission of data between the wired USB device and the wireless USB host. Conveniently, this transmission of data is carried out according to stages 330 and 350, and, according to an embodiment of the invention, also according to stage 340.

According to an embodiment of the invention, the setting up of the wireless connection of stage 320 is a setting up of a wireless connection between the intermediate device and a wireless USB device, wherein the initiating of the wired connection of stage 310 is an initiating of a wired connection between the intermediate device and a USB host, so as to provide wireless USB host capabilities to the USB host.

It is noted that such a setting up and initiating removes the need for HWA driver in the host side, and improves the throughput by removing the HWA protocol overhead over the wired USB interface. Conveniently, in this case the intermediate device represents a wired device (e.g. mass storage) toward the USB Host, and a native wireless host toward the wireless USB device.

Stage 320 is followed by stage 330 of processing first data received from a source to provide second data. Explicitly, the source of any first data conveniently is either the USB device or the host. The processing includes the adaptation of the first data as to conform to standards applied by the target.

According to an embodiment of the invention, stage 330 includes stage 331 of separating the payload from first protocol overhead bits. Such protocol overhead bits may include headers, tokens, or any other bits of the first data that are not part of the payload. Conveniently, the separating is carried out according to either a standard USB protocol or a wireless USB protocol, consequent to information received from the USB class compliant driver emulator and in response to the first parameters and/or to the second parameters.

It is noted that in any data transaction, there is no necessity for an actual payload, as the data transferred may also include of only protocol overhead bits.

Stage 331 is followed by step 332 of preparing the payload to be sent to a target. Explicitly, the target of any second data sent conveniently is either the USB device or the host. Typically data that was processed after being received from one party will be targeted to the other party. Conveniently, second protocol overhead bits are added to the payload, typically preceding and/or following it. The second protocol overhead bits are conveniently constructed according to either a standard USB protocol or a wireless USB protocol, consequent to information received from the USB class compliant driver emulator and in response to the first parameters and/or to the second parameters.

It is noted that stage 332 includes, according to an embodiment of the invention, the preparing to multiple payloads to be sent together, as a single packet, to the target. Similarly, according to an embodiment of the invention, stage 332 includes the dividing of a single payload to multiple payloads, which are sent separately to the target.

According to an embodiment of the invention, stage 330 is followed by stage 340 of determining a next transmission direction in response to information that is included in the first data. Especially, stage 340 includes, according to an embodiment of the invention, determining a next transmission direction according to first data that is sent by the wireless USB host.

According to an embodiment of the invention, stage 340 further includes stage 341 of determining the next transmission direction in response to information that is included in the USB class driver. Stage 341 conveniently is responsive to the USB class protocol, which determines which transmission follows which order, when a reply is requested and so forth. It is therefore clear to any person that is skilled in the art that the determining of the next transmission direction facilitates more efficient a data transmission.

It is further noted that according to an embodiment of the invention, stage 340 and or stage 341 includes the determination of other transmission rate enhancing information in response to information that is included in the first data, in the USB class driver, or in combination thereof.

Method 300 continues with stage 350 of sending the second data to the target. Conveniently, the sending is carried out either according to a standard USB protocol or to a wireless USB protocol, consequent to information received from the USB class compliant driver emulator and in response to the first parameters and/or to the second parameters.

Stage 340 may include stage 351 of responding to control information within the first protocol overhead bits. The responding may include at least one of the following actions: (i) Altering the first parameters and/or the second parameters; (ii) storing or retrieving data from a memory buffer; and the like.

Stage 340 may include stage 352 of creating and transmitting at least one control massage. Conveniently, the control massage is composed according to standard USB or wireless USB protocol, consequent to information received from the USB class compliant driver emulator and in response to the first parameters and/or to the second parameters.

Conveniently, the intermediate device simulates a USB host for the USB device and a wireless USB device for the wireless USB host during stages 330 and 340.

It is noted that stage 310 could follow stage 320, or that the two stages could be carried out concurrently.

Figure 6:
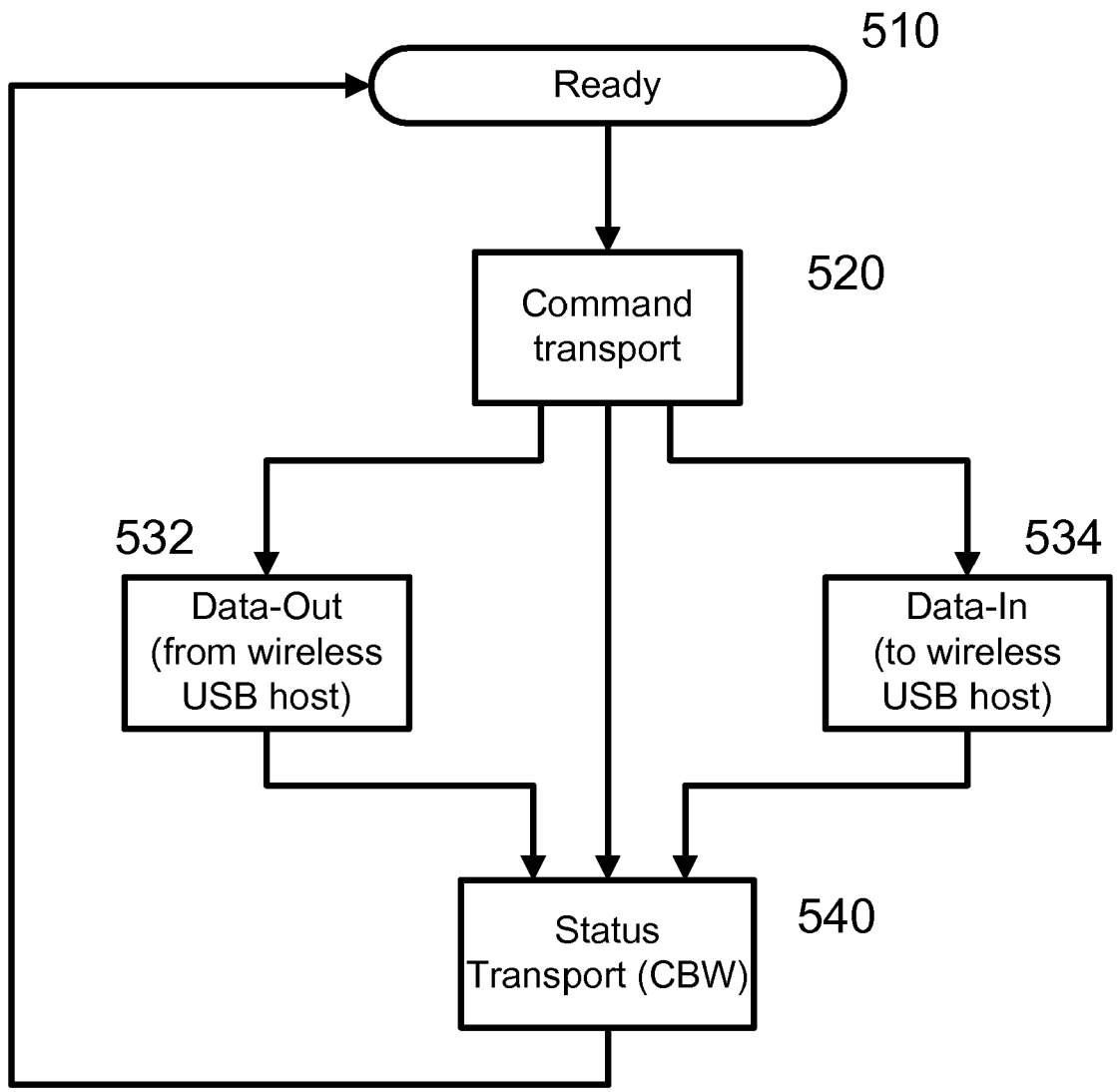
FIG. 6 illustrates a flow chart of data transmission, according to an embodiment of the invention.

FIG. 6 illustrates flow chart 500 of data transmission, according to an embodiment of the invention. The data transmission begins from ready state 510. Wireless USB host 220 is adapted to control the data transmission between wireless USB host 220 and wired USB device 210, and therefore exceeding from ready state 510 occurs when wireless USB host 220 transfers command block wrapper (CBW) 520 to wired USB device 210. Command block wrapper 510 instructs wired USB device 210 to transfer data to wireless USB host 220, or to prepare for the reception of data from wireless USB host 220. The data transmission continues with either transmission of data from wireless USB host 220 (denoted as 532) or the transmission of data from wired USB device 210 to wireless USB host 220 (which is denoted as 534). A command status wrapper (CBW) 540 which is used to report a success or failure of the transmission follows the data transfer 532 or 534, and is followed by returning to ready state 510.

It is noted that, conveniently, the data transmission that is illustrated in flow chart 500 is managed by USB class host compliant driver 226 of the wireless USB host, and by USB class compliant function 218 of wired USB device 210.

Neither wireless USB host 220 nor wired USB device 210 receive indication of the mediation of the data transmission by intermediate device 200. It is nevertheless perspicuous to any person who is skilled in the art the transfer rate of the data transmission is directly dependant on intermediate device 200, and on the speed in which intermediate device 200 mediate the data.

According to the teaching of the invention, intermediate device 200 is adapted to determine transfer rate enhancing information (such as next transmission direction) in response to command block wrapper 510, and/or in response to additional information that is consisted in the first data.

It is further noted that since the USB class protocol is very deterministic, processor 250 of intermediate device can be relatively simple, as it only needs to answer a limit scope of alternative at each stage of the data transmission. Particularly, processor 250 demands significantly less computing power than prior art device host adapters 202.

Figure 7:
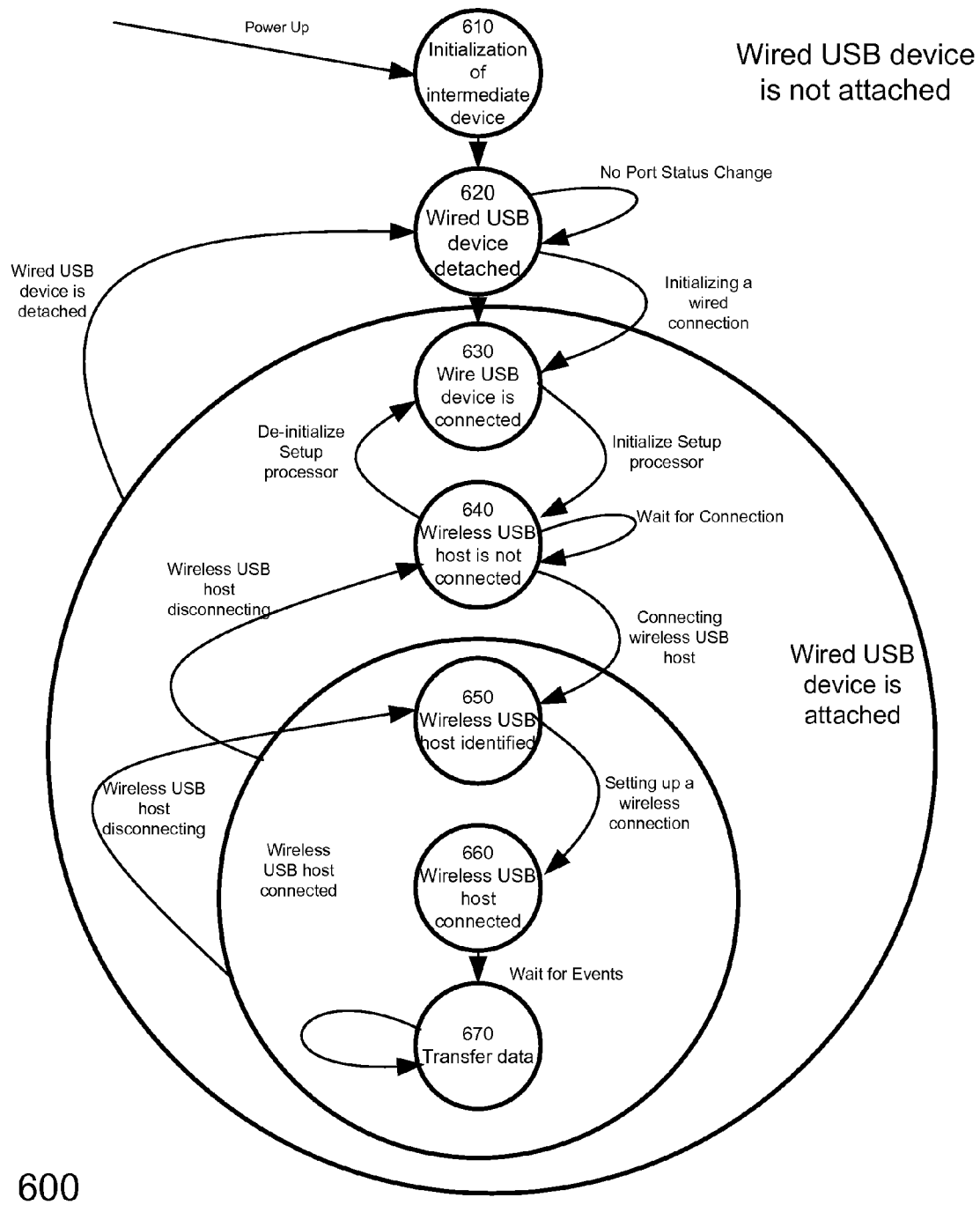
FIG. 7 illustrates a finite state machine according to which the intermediate device operates, according to an embodiment of the invention.

FIG. 7 illustrates finite state machine 600 according to which intermediate device 200 operates, according to an embodiment of the invention.

An initial state of finite state machine 600 is state 610 of initialization of intermediate device 200. The initialization conveniently occurs when intermediate device 200 is connected to a power supply. Once intermediate device 200 is initialized, it passes to state 620 wherein wired USB device 210 is still not connected to intermediate device 200.

A state transition occurs when wired USB device 210 is being connected to intermediate device 200. Conveniently, when wired USB device 210 is being connected to intermediate device 200, intermediate device 200 carries out stage 310 of method 300 aforementioned. Once the initiating of stage 310 is completed, intermediate device passes to state 630 in which wired USB device 210 is connected to intermediate device 200.

According to an embodiment of the invention, intermediate device 200 passes to state 640 in which wireless USB host 220 is still not connected by an initiation of a setup processor of intermediate device 200, wherein the setup processor is adapted to attempt to set up a wireless connection with wireless USB host 220.

It is noted that the setup processor may be de-initialized, in which case intermediate device 200 returns to state 630.

Once intermediate device 200, and especially the setup processor, acknowledges a wireless USB host 220 to which it should connect, intermediate device 200 passes to state 650 wherein wireless USB host 220 is identified. It is noted that, according to an embodiment of the invention, state 650 could be reached even when wired USB device 210 is not connected, while intermediate device 200 waits for connecting to wired USB device 210. The modifications that need to be made for state machine 600 are straight forward to any person who is skilled in the art.

The carrying out of stage 320 of method 300, of setting up a wireless connection with wireless USB host 220, passes intermediate device to stage 660 in which wireless USB host 220 is connected.

Intermediate device 200 than waits for an event, which is a transmission of data from either wireless USB host 220 or wired USB device 210 to the other party. Once an attempt to transfer data is recognized by intermediate device 200, is passes to state 670 of transferring data, wherein intermediate device 200 carries out one or more stages out of stages 330, 340 and 350.

A disconnection of wireless USB host 220 when in states 650, 660 or 670 causes intermediate device 200 to pass to either state 640 or 650, depending on the type of disconnection.

A disconnection of wired USB device 210 when in states 630, 640, 650, 660 or 660, causes intermediate device 200 to pass to state 620.

When in the different states of finite state machine 620, and during the transitions between states, intermediate device 200 is adapted, according to an embodiment of the invention, to expect different data transmission between wireless USB host 220 and wired USB device 210, conveniently in accordance with protocols to which the USB class compliant driver emulator conforms.

By foreseeing an upcoming transmission of data, intermediate device 200 is adapted for a high throughput.

Figure 8A:
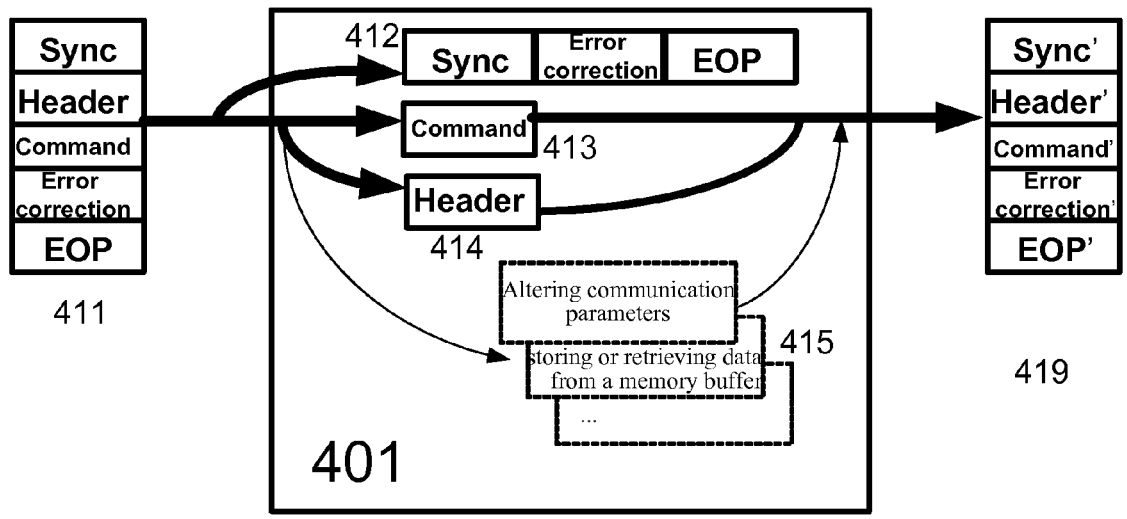
FIGS. 8a and 8b illustrate data processing according to various embodiments of the invention.
Figure 8B:
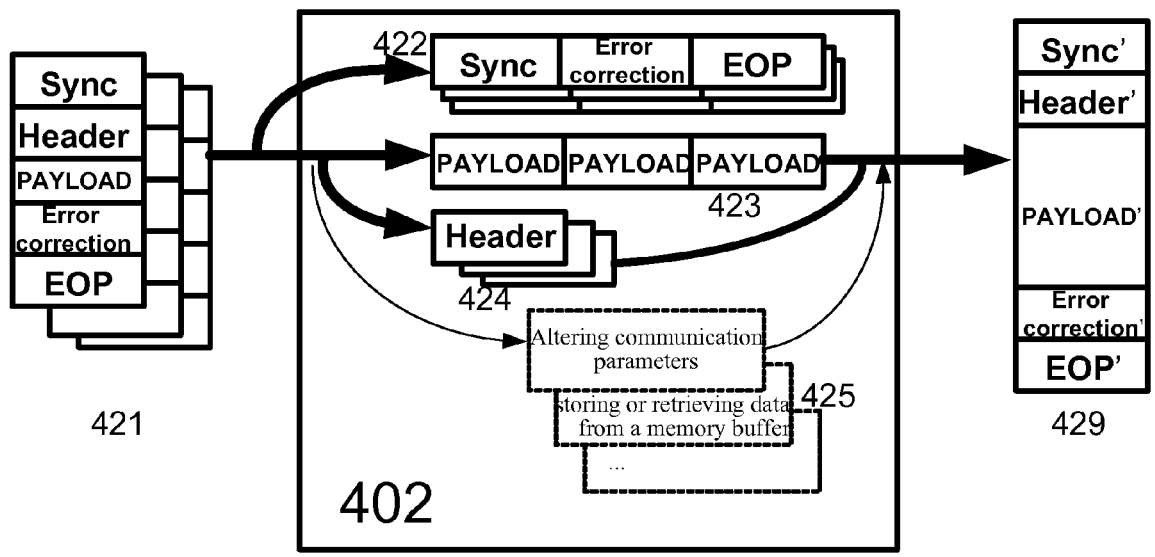

FIGS. 8a and 8b illustrate data processing according to various embodiments of the invention. It is noted that the actual data processing stage is much more complicated, and may further include various information types not mentioned in FIGS. 4a and 4b.

FIG. 8a is an illustration of a first processing stage 401 which is a processing of a first control massage 411. Processing stage 401 begins with separating the first control massage 411 to different parts. A first part 412 includes information that was only usable during the communication with the source, such as synchronization information, Error correction bits, and an End-of-Packet indicator, and the like. The data that is included in the first part 412 is of no further use, and will not serve the processing of the first control massage 411 to provide a second control massage 419. Other parts of the first control massage 411 include a header 414 and a command 413. The processing of the first control massage 411 is sometimes followed by the carrying out of actions 415 such as: (i) Altering the first parameters and/or the second parameters; (ii) storing or retrieving data from a memory buffer; and the like.

The processing 401 of the first control massage 411 continues by processing of the parts 413 and 414 to provide the second control massage 419 that is ready to be sent to the target, in response to information within the parts 413 and 414, to one or more actions 415, or in response to any combination of the above.

FIG. 8b is an illustration of a second processing stage 402 which is a processing of several first data packets, collectively denoted 421. The second processing stage 402 begins with separating the first data packets 421 to different parts. A first part 422 is consisting of information that was only usable during the communication with the source, such as synchronization information, Error correction bits, and End-of-Packet indicators. The data of the first part 422 is of no further use, and will not serve the processing of the first data packets 421 to provide a second data packet 429. Other parts of the first data packets 421 are consisting of headers collectively denoted as 424 and the payloads, collectively denoted as 423. The processing of the first data packets 421 is sometimes followed by the carrying out of actions 425 such as: (i) Altering the first parameters and/or the second parameters; (ii) storing or retrieving data from a memory buffer; and the like.

The processing 402 of the first data packets 421 continues by processing of the parts 423 and 424 to provide the second data packet 429 that is ready to be sent to the target, in response to information within the parts 423 and 424, to one or more actions 415, or in response to any combination of the above. In this example, multiple first data packets 421 from the target where combined to the single second data packet 429 designated to the target, because of the differences between the protocol used for communicating with the source and the protocol used for communicating with the target.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A method for connecting a universal serial bus (USB) host and a USB device, the method comprises:
   initiating a first USB connection between an intermediate device and the USB device, in response to a USB class of the USB device, by using at least one USB class compliant driver emulator that is included in the intermediate device, wherein the USB class defines a USB protocol selected from multiple wireless USB protocols and multiple wired USB protocols;
   setting up a second USB connection between the intermediate device and the wireless host, wherein the second USB connection is selected between a wireless connection and a wired connection;
   processing input data received from a source device to provide output data; and
   sending the output data to a target device; wherein the target device and the source device are selected from the USB host and the USB device and wherein the sending is using the selected USB protocol.

2. The method according to claim 1, wherein the initiating of the first USB connection is an initiating of a wired connection between the intermediate device and the USB host, so as to provide wireless USB host capabilities to the USB host, and wherein the setting up of the second USB connection is a setting up of a wireless connection between the intermediate device and the USB device.

3. The method according to claim 1, wherein the initiating of the first USB connection is an initiating of a wired connection between the intermediate device and the USB device, so as to provide wireless USB host capabilities to the USB device, and wherein the setting up of the second USB connection is a setting up of a wireless connection between the intermediate device and the USB host.

4. The method according to claim 1, whereas the setting up is responsive to at least one first parameter defined during or prior to the initiating; and wherein the initiating is carried out in response to at least one second parameter defined during or prior to the setting up.

5. The method according to claim 1, wherein the processing comprises separating the payload from one or more first protocol overhead bits.

6. The method according to claim 5, wherein the processing includes adding one or more second protocol overhead bits to the payload.

7. The method according to claim 1 further comprises determining the USB class of the USB device in response to a descriptor of the USB device.

8. The method according to claim 1 further comprises determining the USB class of the USB device in response to information which is included in the input data received from the USB device.

9. The method according to claim 5, wherein sending comprises creating and transmitting of at least one control massage, wherein the creating and transmitting are conveniently carried out in response to the first protocol overhead bits.

10. The method according to claim 1, wherein sending includes creating and transmitting at least one control massage.

11. The method according to claim 1, further comprising determining whether the USB device belongs to a USB class which is supported by the USB class compliant driver emulator.

12. The method according to claim 1, further comprising providing power to the USB device.

13. The method according to claim 1, wherein the initiating comprises initiating the wired connection between the intermediate device and multiple wired USB devices of different USB classes.

14. An intermediate device, comprising:
a wired universal serial bus (USB) communications component;
a wireless USB communications component;
a memory unit;
a USB class compliant driver emulator constructed in response to at least one characteristic of a USB device; and
a processor, coupled to the wired USB communications component, to the wireless USB communications component, to the USB class compliant driver emulator and to the memory unit; wherein the processor is adapted to initiate a first USB connection between the intermediate device and the USB device, in response to a USB class of the USB device, by using the USB class compliant driver emulator and wherein the USB class defines a USB protocol selected from multiple wireless USB protocols and multiple wired USB protocols.

15. The intermediate device to claim 14, wherein the wired USB communication component is adapted to initiate a wired connection with a USB host, so as to provide wireless USB host capabilities to the USB host, and wherein the wireless USB communication component is adapted to set up a wireless USB connection with a wireless USB device.

16. The intermediate device to claim 14, wherein the wired USB communication component is adapted to initiate a wired connection with the USB device, so as to provide wireless capabilities to the USB device, and wherein the wireless USB communication component is adapted to set up a wireless USB connection with a wireless USB host.

17. The intermediate device according to claim 14, wherein the wireless USB communication component conveniently is adapted to set up a wireless USB connection with the host in response to at least one first parameter defined during or prior to the initiation of a wired USB communication with a USB device; and the wired USB communication component conveniently is adapted to initiate a wired connection with the USB device in response to at least one second parameter defined during or prior to the setting up of a wireless USB connection with a host.

18. The intermediate device according to claim 14, whereas the processor is adapted to separate a payload from a first protocol overhead bits.

19. The intermediate device according to claim 14, wherein the processor is adapted to add second protocol overhead bits to the payload.

20. The intermediate device according to claim 14, wherein the processor is further adapted to determine the USB class of the USB device in response to a descriptor of the USB device.

21. The intermediate device according to claim 14, wherein the processor is adapted to determine the USB class of the USB device in response to information which is included in an input data received from the USB device.

22. The intermediate device according to claim 17, wherein the processor, the wired USB communication component and the wireless USB communication component are adapted to create and to transmit at least one control massage in response to information consisted in the first protocol overhead bits.

23. The intermediate device according to claim 14, wherein both the processor, the wired USB communication component and the wireless USB communication component are adapted to create and to transmit at least one control massage.

24. The intermediate device according to claim 14, further adapted to determine whether the USB device belongs to a USB class which is supported by the USB class compliant driver emulator.

25. The intermediate device according to claim 14, further adapted to provide power to the USB device.

26. The intermediate device according to claim 14, wherein the intermediate device is adapted to set the wired USB communication with multiple wired USB devices of different USB classes.

* * * * *